United States Patent Office 3,187,125
Patented June 1, 1965

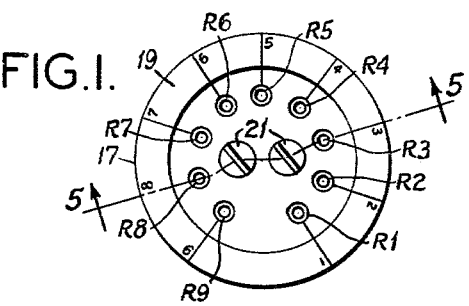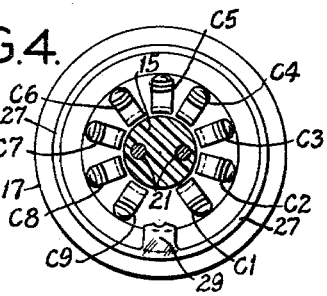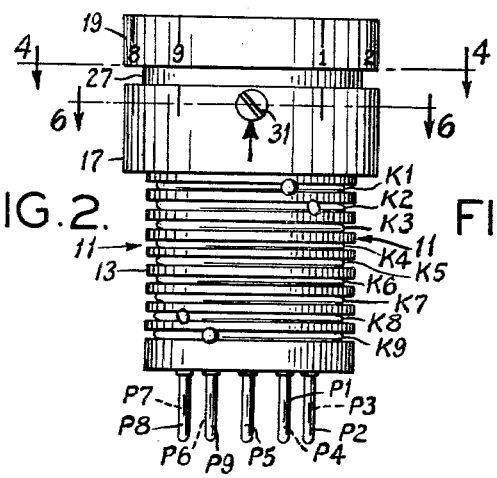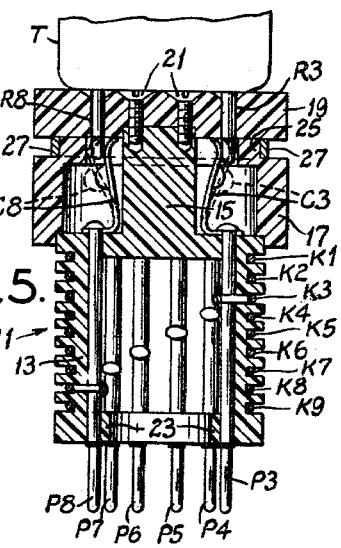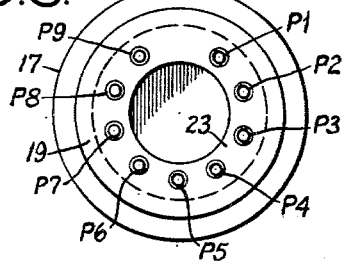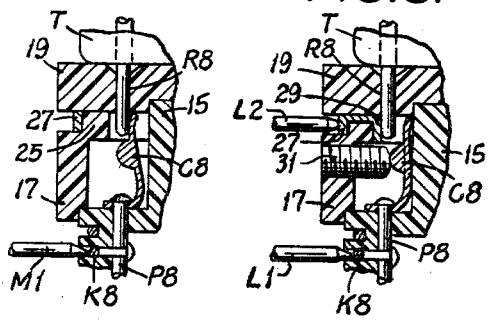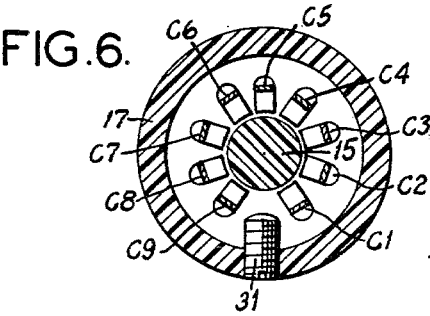

3,187,125
TEST ADAPTER WITH PLUG-IN PINS ELECTRICALLY CONNECTED TO CONDUCTIVE ELEMENTS AXIALLY SPACED ABOUT ITS EXTERIOR PERIPHERY
Simon A. Bergauer, 2311 A. 36th St., Los Alamos, N. Mex.
Filed June 5, 1963, Ser. No. 285,645
12 Claims. (Cl. 200—51.05)

This invention relates to test adapters, and more particularly to test adapters for plug-in type electronic circuit components such as electronic tubes and the like.

Among the several objects of this invention may be noted the provision of a test adapter for a plug-in type electronic circuit component such as a vacuum tube, transistor or the like which provides accessibility to the various elements of the circuit component for testing purposes while maintaining electrical connection between the component and its associated circuits; the provision of a test adapter of the class described wherein test apparatus may be electrically interconnected with any one of the contact pins of an electronic circuit component from substantially any peripheral position about the adapter; the provision of a test adapter for a plug-in type electronic circuit component wherein the current flow to any element thereof may be measured, and wherein this measurement may be made from substantially any peripheral position about the adapter; and the provision of a test adapter of the class described which is relatively inexpensive, rugged and highly reliable in operation. Other objects and features will be in part apparent and in part pointed out hereinafter.

Essentially, the present invention relates to a test adapter for a plug-in type electronic circuit to be interfitted between this component and a socket therefor. This adapter comprises a body, a plurality of contact pins secured to the body at one end thereof which are adapted to be received in the socket, and a plurality of pin-receiving recesses in the other end of the body adapted to receive contact pins of the circuit component. Conductive means are provided, electrically interconnecting each of the contact pins of the circuit component with a corresponding contact pin of the adapter. Finally included are a plurality of conductive elements on the exterior of the body axially spaced along the body between the ends thereof. Each of these conductive elements presents a conductive surface substantially about the periphery of the body and each is electrically connected to a respective one of the contact pins of the adapter whereby test apparatus may be electrically interconnected through a respective conductive element with any of the contact pins of the electronic circuit component from substantially any peripheral position about the adapter.

The invention accordingly comprises the constructions hereinafter described, the scope of the invention being indicated in the following claims.

In the accompanying drawings in which one of various possible embodiments of the invention is illustrated, FIG. 1 is a top view of a preferred form of test adapter of this invention;

FIG. 2 is a side elevation view of this adapter;

FIG. 3 is a bottom view of this preferred embodiment illustrating the pattern of the contact pins thereof;

FIG. 4 is a cross-sectional view taken on line 4—4 of FIG. 2;

FIG. 5 is a cross-section view taken on line 5—5 of FIG. 1 illustrating the interior details of the preferred embodiment;

FIG. 6 is a cross-section taken on line 6—6 of FIG. 2; and

FIGS. 7 and 8 are fragmentary views useful in explaining the operation of the preferred embodiment.

Corresponding reference characters indicate corresponding parts throughout the several views of the drawings.

For purposes of explanation, the invention will be illustrated as comprising a test adapter or socket for a conventional nine-pin miniature electronic tube. Referring now to the drawings, a test adapter constructed in accordance with this invention is illustrated as comprising a body portion or housing designated in its entirety by reference numeral 11. More specifically, body 11 includes a hollow cylindrical portion or member 13 from which projects a reduced diameter post or stud 15. Body 11 further includes a generally annular turret or rotor 17 fitted over stud 15 and held in place by a retaining disc 19. The latter is secured to stud 15 by a pair of screws 21. The upper end of cylindrical portion 13 is received in an annular recess in rotor 17 and forms a journal about which rotor 17 may be rotated. Member 13, rotor 17 and disc 19 may be made of any suitable electrical insulating material.

Nine contact pins P1–P9 are carried through the top portion of member 13 and through an inwardly projecting flange 23 at the bottom thereof. These pins have reduced diameter sections extending from body 11 which are identical both in size and relative position with the pins of a nine-pin miniature electronic tube.

Disc 19 has a plurality of openings therein, R1 through R9, which provide pin-receiving recesses in which may be fitted the contact pins of a miniature electronic tube (indicated at T in FIG. 5) whereby the disc constitutes a socket for this tube. A plurality of spring biased finger contacts C1 through C9 are positioned within the annular space enclosed by rotor 17, disc 19, and the top portion of member 13. These are electrically connected and secured, for example, soldered to the top of a respective one of contact pins P1–P9. Each contact has an upper curved portion which is normally biased radially outwardly (to the dotted-line position in FIG. 5). When the pins of a miniature tube are fitted into recesses R1–R8, they force contacts C1–C8 toward post 15 (see FIG. 5). In this position contacts C1–C9 electrically interconnect each of the pins received in the recesses R1–R9 with a corresponding contact pin of the adapter P1–P9.

The outer surface of body 11 is provided with a plurality of grooves or annular recesses axially spaced along the body from one end adjacent the bottom thereof to the other end adjacent rotor 17. In the grooves or recesses are positioned a plurality of conductive rings or annular contact elements K1–K9. These are electrically insulated one from the other and each is respectively interconnected with one of the contact pins P1–P9. Thus ring or element K1 is electrically connected to pin P1 by a wire looped around pin P1 and soldered both to element K1 and pin P1. Similarly, ring K2 is discretely electrically interconnected with pin P2; and so on.

Rotor 17 has an upwardly extending reduced diameter portion 25 about which is carried a conductive band or contact 27. The latter is electrically connected to a conductive wiper or brush 29 (see FIGS. 4 and 8). Immediately below brush 29 and electrically insulated therefrom is a camming surface constituted by the inner end of a screw 31 threaded through the outer wall of rotor 17. This cam or screw 31 when radially aligned with one of the contacts C1–C9 bears against an enlarged portion or boss on this contact and forces the upper portion of the contact out of engagement with the tube pin received in the respective recess. Concurrently, wiper or brush 29 is brought into electrical contact or engagement with the tube pin received in this recess. Thus when rotor 17 is dialed or positioned as shown in FIG. 2, i.e. with screw 31 located midway between contacts C1 and C9, all of the tube pins are electrically connected through a respective contact C1–C9 to a corresponding pin P1–P9 and a respective contact ring K1–K9. When rotor 15 is rotated to position wherein screw 31 is adjacent or aligned with one of the contacts C1–C9, the circuit between this contact and the respective tube pin is broken. For example, in FIG. 8 the rotor is shown in a position or orientation wherein screw 31 forces contact C8 out of engagement with the tube pin in recess R8. In this position of the rotor, brush 29 interconnects this pin with conductive band 27. As explained hereinafter, rotor 17 and its associated components facilitate a measurement or test of the current flowing into or out of an element of tube T. Suitable indicia may be inscribed on rotor 17 and disc 19 to indicate the position of the rotor 17 or screw 31 with respect to the various pins.

As noted above, the adapter of FIG. 1 provides accessibility to the various elements of tube T for test purposes while maintaining the electrical connection between these elements and the circuitry associated with the tube. In use, the tube is removed from its socket and replaced by the adapter. The tube is then fitted or plugged into the socket at the top of the adapter. With rotor 15 in its neutral position, i.e. with the screw 31 positioned between pins 1 and 9, voltage or impedance measurements may be made at any pin merely by contacting a respective annular contact (K1–K9) with a test probe. Thus, as illustrated in FIG. 7, the voltage of pin 8 with respect to any other pin or circuit component may be measured by contacting an annular contact K8 with a test probe M1. An essential feature of this invention is that this measurement (or a similar measurement for any of the other pins) may be made from any position about the periphery of the adapter. This is particularly important in modern electronic apparatus where space limitations result in the crowding of the various components. The adapter of this invention thus possesses a marked advantage in this regard over prior art test adapters where voltage and resistance measurements for each pin can only be made from one peripheral position or angle.

The adapter of this invention also permits a measurement of the current flowing into or out of a pin of the tube, and again this measurement may advantageously be made from any peripheral position. To measure the current flow to pin 8, for example, turret or rotor 17 is rotated until screw 31 is positioned adjacent pin 8. As explained above, this disconnects contact C8 from pin 8 of the tube and connects band 27 thereto. An ammeter may then be connected in series with pin 8 merely by contacting contact ring K8 and band 27 with the leads or probes of the ammeter. This connection is illustrated in FIG. 8 wherein leads L1 and L2 of an ammeter are interconnected in series with contact pin P8 and pin 8 of tube T.

While the test adapter of this invention is illustrated as being for a nine-pin miniature tube, it will be understood that a similar adapter incorporating the features of this invention may be designed for any other type of tube, or even for other electronic components, for example, plug-in type transistors or functional modules. Moreover, while in the embodiment illustrated, provision is made both for voltage or resistance measurements and for current measurements, it will be understood that it is not essential that an adapter provide both of these functions. For example, in many applications it may be desirable, in the interest of economy, to eliminate rotor 17 and its associated components and provide for a direct or continuous connection between a pin of tube T and a corresponding pin of the adapter. In this latter instance current measurements would not be possible; however, voltage and/or resistance measurements could be made from substantially any point about the periphery of the adapter. As explained above, this constitutes a marked improvement over prior art adapters of this type.

In view of the above, it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A test adapter for a plug-in type electronic circuit component to be interfitted between said component and a socket therefor, said adapter comprising a body, a plurality of contact pins secured to said body at one end thereof adapted to be received in said socket, a plurality of pin-receiving recesses in the other end of said body adapted to receive contact pins of said circuit component, conductive means electrically interconnecting each of the contact pins of said circuit component with a corresponding contact pin of said adapter, and a plurality of conductive elements on the exterior of said body axially spaced along said body between the ends thereof, each of said conductive elements presenting a conductive surface substantially about the periphery of said body and each being electrically connected to a respective one of the contact pins of said adapter whereby test apparatus may be electrically interconnected through a respective conductive element with any of the contact pins of said electronic circuit component from substantially any peripheral position about said adapter.

2. A test adapter as set forth in claim 1 wherein said body is generally cylindrical, and wherein each of said conductive elements comprises a conductive ring which substantially encircles said body.

3. A test adapter as set forth in claim 1 wherein said conductive means electrically interconnecting each of the contact pins of said circuit component with a corresponding contact pin of said adapter includes a spring-biased contact element positioned adjacent each pin-receiving recess and adapted to engage a contact pin received therein and make electrical contact therewith.

4. A test adapter as set forth in claim 3 further including means for selectively disconnecting each of the contact pins of said circuit component from the corresponding contact pin of said adapter, said last-named means comprising a rotor mounted on said body and rotatable with respect thereto, a cam carried by said rotor adapted selectively to force each of said spring-biased contact elements out of engagement with a respective contact pin of said circuit component, and a contact carried by said rotor adapted to make electrical contact with each of said contact pins of said component, whereby an electrical test device may be connected in series between each of said contact pins of said component and the corresponding contact pin of said adapter by connection between said contact carried by said rotor and the conductive element connected to said corresponding contact pin.

5. A test adapter as set forth in claim 4 further including a conductive ring carried by said rotor and electrically connected with said contact carried by said rotor, whereby said test device may be connected with any contact pin of said circuit component from substantially any peripheral position about said adapter.

6. A test adapter as set forth in claim 1 further including means for selectively disconnecting one of the contact pins of said circuit component from the corresponding contact pin of said adapter whereby an electrical test device may be connected in series between said one contact pin of said component and the corresponding contact pin of said adapter.

7. A test adapter for a plug-in type electronic circuit component to be interfitted between said component and a socket therefor, said adapter comprising a body, a plurality of contact pins secured to said body adapted to be received in said socket, a plurality of pin-receiving recesses in said body adapted to receive contact pins of said circuit component, conductive means electrically interconnecting each of the contact pins of said circuit component with a corresponding contact pin of said adapter, said conductive means including spring-biased contact elements, one positioned adjacent each of said recesses and adapted to engage a contact pin received therein, and means for selectively disconnecting each of said contact pins of said component from the corresponding contact pin of said adapter, said last-named means comprising a rotor mounted on said body and rotatable with respect thereto, and means carried by said rotor adapted selectively to force each of said spring-biased contact elements out of engagement with a respective contact pin of said circuit component whereby each contact pin of said component may be disconnected from the corresponding contact pin of said adapter.

8. A test adapter as set forth in claim 7 further including a plurality of conductive elements on the exterior of said body, each of said conductive elements presenting a conductive surface substantially about the periphery of said body and each being electrically connected to a respective one of the contact pins of said adapter whereby test apparatus may be electrically interconnected through a respective conductive element with any of the contact pins of said electronic circuit component from substantially any peripheral position about said adapter.

9. A tube adapter for an electronic tube to be interfitted between said tube and a tube socket, said adapter comprising a body, a plurality of contact pins secured to said body at one end thereof adapted to be received in said socket, a plurality of pin-receiving recesses in the other end of said body adapted to receive the pins of said tube, conductive means electrically interconnecting each of the pins of said tube with a corresponding contact pin of said adapter, and a plurality of conductive elements on the exterior of said body axially spaced along said body between the ends thereof, each of said conductive elements presenting a conductive surface substantially about the periphery of said body and each being electrically connected to a respective one of the contact pins of said adapter whereby test apparatus may be electrically interconnected through a respective conductive element with any of the pins of said tube from substantially any peripheral position about said adapter.

10. A tube adapter as set forth in claim 9 further including means for selectively disconnecting any one of the pins of said tube from the corresponding contact pin of said adapter, a contact element exterior said adapter and means adapted selectively to interconnect said contact element and any one of the pins of said tube whereby a current measuring device may be connected in series between any one of the pins of said tube and the corresponding contact pin of said adapter, said connection being made through said contact element and the conductive element connected to said corresponding contact pin of said adapter.

11. A tube adapter as set forth in claim 10 wherein said disconnecting means, said contact element and said means interconnecting one of the pins of said tube with said contact element are carried by a rotor mounted on said body and rotatable with respect thereto whereby the orientation of said rotor determines which of said tube pins is disconnected from its corresponding adapter pin.

12. A tube adapter as set forth in claim 11 wherein said contact element presents a conductive surface substantially about the periphery of said rotor whereby said current measuring device may be connected in series between each pin of said tube and the corresponding pin of said adapter from substantially any peripheral position about said adapter.

No references cited.

BERNARD A. GILHEANY, *Primary Examiner.*